Patented Aug. 29, 1950

2,520,332

UNITED STATES PATENT OFFICE 2,520,332

CHLORINATED ANACARDIC COMPOSITIONS AND METHODS OF MAKING SUCH COMPOSITIONS

Emil E. Novotny, North Wales, and George K. Vogelsang, La Mott, Pa., assignors to The Borden Company, New York, N. Y., a corporation of New Jersey No Drawing. Application December 3, 1947, Serial No. 789,566

10 Claims. (Cl. 106—243)

Our present invention relates to new chlorinated compositions of matter and to processes for making such compositions.

This application is a continuation in part of application Serial No. 458,950, filed September 19, 1942, now abandoned, which is a division of application Serial No. 188,796, filed February 4, 1938 (now Patent No. 2,306,077, issued December 22, 1942).

The principal object of the present invention is to provide new and novel modifications of the chloroanacardic material disclosed in Patent No. 2,306,077 above referred to.

In the following description and claims, unless otherwise indicated or required by the context, the term "anacardic material" is used to designate the phenolic compounds derived from the Anacardiaceae family of plants, e. g., cashew nut shell liquid, marking nut shell liquid, Japanese lac (urishiol), anacardic acids and the products that result from the decarboxylation or heat treatment of anacardic acid or the nut shell liquids, the distillation products of said phenolic compounds; the products that result by treating said phenolic compounds with alcohols (our Patent No. 2,251,547) or with amines (our Patent No. 2,253,088); the ethers and esters of said phenolic compounds as well as the acylation-distillation products disclosed in our co-pending application Serial No. 391,552, filed May 2, 1941 (our Patent No. 2,401,095); the soluble fusible products that are produced by reacting said phenolic compounds with powerful condensing agents of the type of sulfuric acid, boron trifluoride, Friedel-Crafts catalysts, etc.; the products that result when said phenolic compounds are subjected to heat treatment sufficient to result in a noticeable thickening; and the higher and lower molecular weight fractions isolated from any of said phenolic compounds.

In its very essence, the method of the present invention consists in subjecting anacardic material to the action of a suitable chlorinating agent in the presence of a chlorine reactible organic compound.

The chlorinating agent may be gaseous or liquid chlorine or it may be in the nature of an organic chlorine donor compound, such as tertiary butyl hypochlorite. For practical reasons gaseous chlorine is preferred.

The novel feature that distinguishes the present invention from our prior invention (U. S. Patent 2,306,077) resides in the fact that useful and important modifications are achieved by carrying out the chlorination in the presence of chlorine reactible organic compounds. The ultimate results depend upon the nature and the quantity of the chlorine reactible compound that is added. The nature and quantity of the chlorine reactible organic compound to be added in any specific instance is predicated upon the end use to which the material is to be put. In any event, as far as the present invention is concerned, it is necessary that the quantity of chlorine reactible organic compound added to the anacardic material be kept below the point at which the ultimate chlorinated composition takes on the characteristics of the chlorinated chlorine reactible organic compound per se to a degree where they overshadow the peculiar and desirable attributes associated with the chloroanacardic material per se. We find that the anacardic material should be present in the proportions of at least 50% of the mixture to be chlorinated.

The minimum quantity of chlorine reactible compound that may be utilized depends, among other things, upon the specific nature of the compound, as well as upon the degree of modification desired. The minimum quantity that may effectively be utilized in the case of one compound is not necessarily the same minimum that can be utilized in the instance of some other compound. In many cases it is necessary to add over 20% of chlorine reactible compound to the anacardic material before the end chlorination product is possessed of new attributes sufficiently pronounced to distinguish it from the straight chlorinated anacardic material. In the case of chlorine reactible organic materials such as linseed oil, palm oil, soya bean oil and their fatty acids, 5% on the weight of the anacardic material usually results in an effective and significant degree of modification. As a general rule, the chlorine reactible organic compounds should be added to the extent of at least 5% on the weight of the anacardic material.

The nature and quantity of the chlorine reactible organic compound added to the anacardic material depends, among other things, upon the nature of the chemical and physical properties with which the ultimate chlorination product is to be endowed. In practice the chlorine reactible organic compound is usually added within the range of from 5 to 100% on the weight of the anacardic material. Stated another way, the mixture to be chlorinated will comprise an anacardic material content ranging between 50% and 95% of the whole, while the chlorine reactible organic compound content will range between 5 and 50%.

Although the nature of the end product is manifestly controlled by the nature and the quantity of the chlorine reactible organic compound that is added to the anacardic material, there are also a number of other very important influences that exert a profound effect upon the ultimate product. Among the controlling factors may be mentioned the temperature, the length of time consumed in the chlorination process and the quantity of chlorine introduced. It is also feasible to carry out the chlorination of a mixture comprising chlorine reactible organic compound plus anacardic material in the presence of a substantially inert solvent such as carbon tetrachloride, etc.

By chlorinating anacardic material in the presence of chlorine reactible organic compounds it is possible to produce a well nigh infinite variety of end products. The precise nature of the end product will depend upon a number of factors including the temperature, the length of time consumed in the chlorination, the quantity of chlorine introduced and the quantity and type of chlorine reactable organic compound that is utilized in conjunction with the anacardic material.

The temperature schedule to be maintained during the chlorination depends upon so many factors that it is not feasible to engage in narrow generalizations. Under appropriate conditions one may utilize sub-zero temperatures or temperatures as high as perhaps 500° F. Upon the basis of numerous experiments as well as upon the basis of industrial chlorinations, we have ascertained that practical chlorinations may be carried on in the temperature range of from 40° F. to approximately 400° F. For most applications the temperature range will lie between 100° F. and 350° F. The temperature prevailing during the chlorination affects the end result in several ways. The temperature exerts somewhat of a directive influence upon the mechanism of chlorination. At low temperatures the chlorination is largely of an additive nature, whereas at elevated temperatures increasing amounts of substitutive chlorination takes place. In virtually all chlorinations carried out under practical conditions some substitutive chlorination occurs as is evidenced by the fact that hydrogen chloride is evolved.

The temperature also is a controlling factor in the amount of condensation-polymerization that occurs during the course of the chlorination. At low temperatures these reactions are kept at a minimum, whereas at elevated temperatures a substantial amount of condensation-polymerization may occur as is readily evidenced from the pronounced increase in the viscosity of the reacting mass when maintained at elevated temperatures as compared to a product of similar chlorine content but chlorinated at a low temperature. For this reason it is not feasible to utilize temperatures above 250° F. in instances where it is desired to introduce a large quantity of chlorine unless one uses a suitable quantity of appropriate inert diluent. The temperature exerts a more or less analogous effect upon the chlorination of the chlorine reactable organic compound. Also, as is pointed out below, there is evidence that the chlorine reactible compound reacts with the anacardic material during the process of chlorination. The extent of this type of reaction may be small or large depending upon a variety of factors.

The length of time consumed in carrying out a given degree of chlorination exerts a definite effect upon the nature of the end product. It is self-evident that where the reaction velocity between the chlorine and the material being chlorinated is less than instantaneous, the instantaneous chlorine concentration in the mass will depend upon the rate at which the chlorine is being introduced. It is well known that in many instances the nature and the direction of the chlorination is influenced by the chlorine concentration. It is equally clear that for the introduction of a given amount of chlorine at a given temperature the extent of the polymerization-condensation reaction that takes place will be largely dependent upon the length of time that the mass was kept at those temperatures. It is usually desirable to carry out the chlorination in the shortest possible time. The reaction, however, is quite exothermic and when the chlorination is rapidly carried out provision must be made to carry away the heat of reaction unless it is desired to operate at very elevated temperatures, under which conditions the heat is more rapidly dissipated.

The nature of the end products is obviously affected by the chlorine content. The chlorine content may vary from as little as 5% to as much as approximately 70%. It has been determined, however, that in order that the end product be possessed of the desirable and peculiar attributes associated with chloro-anacardic materials to a degree that is adequate and substantial enough to permit of its utilization for specific purposes, it is desirable that the chlorine content be at least 10% on the weight of the anacardic material. A chlorine content of between 10% and 30% is preferred.

In cases where it is desirable to keep substitutive chlorination at a minimum, the chlorination should be carried out at relatively low temperatures, e. g., in the range of from 120° F. to approximately 40° F. Substitutive chlorination is minimized by the inclusion of an inert diluent, such as carbon tetrachloride. Owing to the fact that the mixture comprising anacardic acid and the chlorine reactible organic compound is possessed of a rather high viscosity at low temperatures, specially designed chlorinating equipment is recommended in order to permit of efficient chlorination in a reasonable length of time. The presence of an inert diluent is exceedingly helpful in that it cuts down the viscosity to a point where a more rapid degree of chlorination is possible.

Catalysts do not appear to be particularly effective in expediting the rate of chlorination. In some instances, however, catalysts, or so-called chlorine carriers favor the formation of substitution products.

The degree of acidity or alkalinity maintained during the chlorination has an effect upon the nature of the end product. All things being equal, it is preferable to carry out the process slightly on the acid side. High acidity and high alkalinity favor the condensation-polymerization reactions.

Inasmuch as the controlling factor that distinguishes the product of the present invention from that of the inventors' prior invention disclosed in Patent No. 2,306,077 is dependent upon the nature and quantity of the chlorine reactible organic compound that is added to the anacardic material, a consideration of the nature of these compounds will be conducive to a better understanding of the present invention.

No two modifying agents give exactly the same result. The choice of modifying agents is predicated upon the desired attributes of the end product. Modifying agents may be used singly or in admixture and may be added in different proportions, depending upon the desired results. For most purposes the quantity of chlorine reactible material to be added will range between 10% and 50% on the weight of the anacardic material, although as little as 5% and as much as 100% on the weight of the anacardic material is within the purview of the present invention.

The chlorine reactable organic compound utilized for the purposes of the present invention may be selected from any one of several classes of organic compound. The only prerequisite is that the compound selected be reactable with chlorine under the conditions maintaining during the chlorination of the anacardic material. Any chlorine reactible organic compound that is capable of reacting with chlorine in the temperature range of from about 350° F. to below 40° F. is suitable.

As representative of the class of compounds suitable for use as the "chlorine reactable organic compound" in practicing the present invention may be mentioned the following: mono- and polyhydric alcohols; unsaturated hydrocarbons; aldehydes; ketones; carboxylic acids; organic derivatives of nitrogen, phosphorus, sulfur, silicon, selenium, boron, tin, germanium, antimony, arsenic, etc.; metallo organic compounds, organic halogen compounds capable of further reaction with chlorine under the conditions prevailing during the chlorination of anacardic material; organic compounds containing a plurality of functionally reactive atomic groups, such as hydroxy groups, aldehyde groups, ketone groups, carboxylic groups, amino groups, sulfhydryl groups, etc. The chlorine reactible organic compounds may be selected from the class of aliphatic, carbocyclic or heterocyclic compounds. The chlorine reactible organic compound may be monomeric in character or it may be polymeric. The material may represent a pure crystallizable entity or it may be amorphous and resinous in character, examples of which are keto-butanol resins, cresol-formaldehyde resins and unsaturated hydrocarbon resins.

Although the number of chlorine reactive organic compounds that may be used for the purposes of the present invention is very large, a relatively small group of compounds suffices for all commercial applications. Foremost in the list of desirable chlorine reactible compounds are the various oils, of mineral, animal or vegetable origin. The fatty acids derived from the animal and vegetable oils (or their synthetic equivalents) are particularly suitable. Of the alcohols, methanol, ethanol, propinol, isopropinol, the various butanols, pentanols and hexanols are of particular interest. Alcohols with more than six carbon atoms are preeminently suited for use as regards their efficacy as modifying agents but their use is current severely restricted owing to their high cost. Of the ketones, acetone, ethyl methyl ketone, diethyl ketone, methyl propyl ketone, ethyl butyl ketone, and the various vinyl ketones are preeminently suitable. In the category of the polyhydric alcohols, ethylene glycol, diethylene glycol, triethylene glycol, hexane-diol and the various glycols up to and including eight carbon atoms, as well as the higher glycols such as mannitol and sorbitol as well as their ethers and esters are of particular interest. Of the class of the carbocylic acids the mono- or polycarbocylic acids containing from one to ten carbon atoms, as well as the esters derived from these acids are well suited. Most ethers containing from 2 to 10 carbon atoms are useful, with preference being given to the unsaturated ethers such as the vinyl ethers and the alkyl ethers of aromatic compounds such as methyl phenyl ether. Phenols are particularly suitable, e. g., phenol, the cresols and in general the substituted phenols of benzene. Turpentine, rosin and the various derivatives of these compounds are well suited. Amines, particularly the amines of carbocyclic compounds and the heterocyclic compounds such as aniline, the toluidines, the xylidines, alpha naphthylamines, triamyl amine, trihexyl amine, furfurylidine ethylamine, and the alkyl ureas; unsaturated compounds such as coumarone, indene, styrene, the alkyl acrylates, vinyl monomers, vinylidine chloride, allyl ester, and the unsaturated monomeric esters in general; thio alcohols and thio ethers as well as the fluid polymers such as the polyfunctional mercaptans, function well as modifying agents.

The animal and vegetable oils and fats constitute a class of particularly suitable chlorine reactible organic compounds for use in the present invention. For convenience we hereinafter refer to this class of materials as "fatty oils" and use this term as defined on page 591 of Hackh's Chemical Dictionary (Third Edition).

It is well known that the chlorination of complex organic compounds is often accompanied by complex side reactions, resulting sometimes in depolymerizations and in other instances in condensations and polymerizations. The chlorination of anacardic material is a case in point. Unless a large quantity of diluent be employed, along with low temperatures, a greater or lesser degree of condensation-polymerization reaction will always occur. The extent of these side reactions is appreciably greater than what can be accounted for in terms of the time-temperature schedule and the pH environment. This leads to the conclusion that the mechanism of chlorination is directly involved in this extra condensation-polymerization. Upon the basis of numerous tests it appears that when the chlorination of anacardic material is carried out in the presence of chlorine reactable organic compounds some of the chlorine reactable compound not infrequently enters into reaction with the anacardic material, resulting in the production of new organic compounds. In any event, whether or not this theory is correct, the chlorination products of the present invention are possessed of new and distinctive attributes as compared to those of straight chlorinated anacardic material.

The following examples are illustrative of the process and products of the present invention. These examples have been drawn to the use of a few types of modifying agents of the preferred class. The conditions of chlorination as regards the temperature, time of chlorination and the chlorine content has been deliberately selected so as to typify the preferred practice. The examples are not to be construed as restrictive either in respect to the quantity or type of chlorine reactable organic compound used or as regards to the conditions maintaining during the chlorination, inasmuch as any chlorine reactable compound as previously defined and all operating conditions within the above-stated ranges may be employed in carrying out the teachings of the present invention.

Example I

Into a chlorinator provided with suitable means for heating, cooling and agitating the contents, as well as with a reflux condenser and vapor pipe, were introduced 100 parts of anacardic material (heat treated cashew nut shell liquid) along with 5 parts of linseed oil. Chlorine was bubbled through the mass while the temperature was kept at about 90° F. by circulating cold water. The chlorination was stopped when 10% of chlorine on the weight of the anacardic material had been introduced. During the chlorination a small amount of hydrogen chloride was evolved and collected in a scrubber. The resultant chlorinated product, to all outer appearances, did not differ much from that of the original anacardic material. The specific gravity was now 1.034 as compared to 1.01 prior to the chlorination. Chemically the modified product was more reactive and rubber stocks compounded with its aid were possessed of a greatly improved processability as compared to stocks made with a straight chloro-anacardic material (i. e., chlorinated in the absence of the chlorine reactable organic modifying compound).

Example II

The equipment and the reactants were similar to those of Example I. The chlorination was carried out at a temperature of 300° F. The end product was similar to that of Example I except for the greatly increased viscosity due to condensation-polymerization reactions that occurred to a much greater degree owing to the high temperature employed. The resultant product was capable of being milled into synthetic rubber compounds much more readily than the product of Example I, without detracting in any way from the desirable attributes that the product of Example I imparted to the stock.

Example III

Equipment was similar to that employed in Example I. The charge comprised 75 parts by weight of anacardic material (heat treated cashew nut shell liquid), 10 parts of cotton seed oil fatty acid, 10 parts of linseed oil and 5 parts of pine oil. Gaseous chlorine was bubbled through the mass until the chlorine content of the resultant product reached 30%. During the chlorination the temperature was held at 250° F. The resultant viscous product was very reactive chemically. The addition of small quantities of paraformaldehyde, furfural or hexamethylenetetramine chloroacetate caused it to set very quickly to the infusible state upon heating. The material differed from that prepared from straight chloro-anacardic material (i. e., chlorinated in the absence of the chlorine reactable organic compounds) in that it was much more rubbery and softer in character. The product retained these qualities for a much longer period of time than a similar sample chlorinated in the absence of the modifying agent.

Example IV

The equipment used was similar to that described in connection with Example I. 100 parts of anacardic material (acylation-distillation product of cashew nut shell liquid) along with 15 parts of diallyl phthalate were placed into the chlorinator. 25 parts of chlorine were introduced over a period of 7 hours. The temperature was maintained between 175° F. and 200° F. The resultant product was viscous dark amber to brown colored, and upon co-polymerization with material such as vinyl acetate, acrylonitrile, etc., reacted much more rapidly and yielded harder, tougher products than when made from a similar material chlorinated in the absence of the chlorine reactable organic compound.

Example V

Run No. III was repeated with 300 parts by weight of carbon tetrachloride included in the charge. The temperature was kept at between 40° F. and 100° F. The chlorination was terminated when 10 parts of chlorine had been introduced. The viscosity at the end of the chlorination was only slightly higher than that of the original charge.

Example VI

Utilizing the equipment of Example I, approximately 70 parts of chlorine were passed into a mixture consisting of 100 parts of anacardic material (heat treated cashew nut shell liquid), 25 parts of ethyl hexanol and 500 parts of carbon tetrachloride. The temperature was maintained at between 100° F. and 150° F. The chlorinated mixture was concentrated under reduced pressure for the purpose of removing the carbon tetrachloride. The residuum was in the form of a dark colored heavy viscous tacky material possessing a pungent acrid odor, and high chemical activity.

Example VII

Utilizing the equipment of Example I ten parts of chlorine were passed into a mixture consisting of 100 parts of anacardic material (cashew nut shell liquid heat treated to 450° F.) and 10 parts of turpentine. The temperature was maintained at 350° F. The chlorination was completed in approximately one hour's time. The resultant product was a thick, black, solid material quite similar to the product of Example I.

At this point, it is to be noted that it is possible to carry out the chlorination in a continuous fashion by connecting several chlorinators in series and passing the material being chlorinated and the chlorine in counter-current directions.

The products of the present invention can advantageously be used in lieu of straight anacardic materials, in the manner described in our prior Patent No. 2,306,077. As is almost invariably the case, in all material matters a product is seldom perfect or ideal for any specific purpose. Straight chlorinated anacardic material is preeminently suited for a wide variety of industrial applications. Notwithstanding this preeminence it is realized that it is not the ideal material when it comes to a matter of fine detail. It is here that the materials of the present invention show up particularly well because by appropriately modifying the product via the incorporation of adequate quantities of pre-selected chlorine reactible organic compounds, it is possible to produce compounds that more nearly meet the exacting requirements of a particular situation.

The products of the present invention are particularly suited for incorporation into natural or synthetic rubbers, resins and plastics. As such the materials are useful in the manufacture of adhesives, cements, impregnating agents, lutes, lacquers, paints, varnishes, synthetic resins, gums, rubbers and molding compositions. Said products are particularly useful for the manufacture of filling compounds for electric cables, conduit boxes, small transformers, etc.

The products of the present invention are particularly suited for the manufacture of laminated products. When used for this purpose, the end products are possessed of a greater flexibility, resilience and improved stability as compared to similar products made from chloro-anacardic material of the same chlorine content but chlorinated in the absence of the chlorine reactible organic compounds.

The products of the present invention are particularly useful for co-condensation and polymerization with other polymerizable or condensible materials such as the polymerizable monomers as vinyl acetate, acrylo nitrile, butadiene monoxide, acrylates, aryl monomers, etc. When utilized in this manner, it is possible to produce superior friction augments for use in the manufacture of brake linings, clutch facings, etc.

The products of the present invention are particularly useful as leather impregnants. After impregnation into the leather they may be converted to the insoluble, infusible state by the inclusion of appropriate cross-linking agents preferably of the type containing reactive methylene groups or derivatives of the fully saturated halogenation products of the aldehydes of the mono hetero atomic five membered rings, e. g., chlorinated furfural.

The products of the present invention are particularly suitable for the modification of thermosetting resins such as those of the phenol-aldehyde type wherein they may be utilized for the purpose of modifying their resilient character.

The products of the present invention are particularly suited for the manufacture of printing plates, phonograph records, noiseless gears, flooring materials and similar items. Said products are also well suited for the manufacture of laminating resins.

We claim:

1. The method of preparing modified chloro-anacardic materials which comprises the steps of passing chlorine into a mixture maintained at a temperature of from about 40° F. to 350° F., until between 10 and 70 parts of chlorine have been absorbed, said mixture consisting of 100 parts of anacardic material and between about 5 and 100 parts of a chlorine reactable organic compound which is reactable with chlorine over the afore-indicated range of temperatures.

2. The method of preparing modified anacardic materials which comprises the steps of passing chlorine into a mixture maintained at a temperature of from about 40° to 350° F. until between 10 and 70 parts of chlorine have been absorbed, said mixture consisting of 100 parts of anacardic material and between about 5 and 100 parts of a chlorine reactable organic compound which is reactable with chlorine over the afore-indicated range of temperatures and an inert solvent.

3. The method of preparing modified chloro-anacardic materials which comprises the steps of passing chlorine into a mixture maintained at a temperature of from about 40° F. to 350° F. until between 10 and 70 parts of chlorine have been absorbed, said mixture consisting of 100 parts of anacardic material and between about 5 and 100 parts of fatty oils.

4. The method of preparing modified chloro-anacardic materials which comprises the steps of passing chlorine into a mixture maintained at a temperature of from about 40° F. to 350° F. until between 10 and 70 parts of chlorine have been absorbed, said mixture consisting of 100 parts of anacardic material and between about 5 and 100 parts of a fatty acid derived from a fatty oil.

5. The method of preparing modified chloro-anacardic materials which comprises the steps of passing chlorine into a mixture maintained at a temperature of from about 40° F. to 350° F. until between 10 and 70 parts of chlorine have been absorbed, said mixture consisting of 100 parts of anacardic material and between about 5 and 100 parts of an unsaturated organic compound which is reactable with chlorine over the afore-indicated range of temperatures.

6. Modified chloro-anacardic materials prepared via the method which comprises the steps of passing chlorine into a mixture maintained at a temperature of from about 40° F. to 350° F. until between 10 and 70 parts of chlorine have been absorbed, said mixture consisting of 100 parts of anacardic material and between about 5 and 100 parts of a chlorine reactable organic compound which is rectable with chlorine over the afore-indicated range of temperatures.

7. Modified chloro-anacardic materials prepared via the method which comprises the steps of passing chlorine into a mixture maintained at a temperature of from about 40° F. to 350° F. until between 10 and 70 parts of chlorine have been absorbed, said mixture consisting of 100 parts of anacardic material and between about 5 and 100 parts of fatty oils.

8. Modified chloro-anacardic materials prepared via the method which comprises the steps of passing chlorine into a mixture maintained at a temperature of from about 40° F. to 350° F. until between 10 and 70 parts of chlorine have been absorbed, said mixture consisting of 100 parts of anacardic material and between about 5 and 100 parts of fatty acid derived from a fatty oil.

9. Modified chloro-anacardic materials prepared via the method which comprises the steps of passing chlorine into a mixture maintained at a temperature of from about 40° F. to 350° F. until between 10 and 70 parts of chlorine have been absorbed, said mixture consisting of 100 parts of anacardic material and between about 5 and 100 parts of an unsaturated organic compound which is reactable with chlorine over the afore-indicated range of temperatures.

10. Modified chloro-anacardic materials prepared via the method which comprises the steps of passing chlorine into a mixture maintained at a temperature of from about 40° F. to 350° F. until between 10 and 70 parts of chlorine have been absorbed, said mixture consisting of 100 parts of anacardic material and between about 5 and 100 parts of a chlorine reactable organic compound which is reactable with chlorine over the afore-indicated range of temperatures and an inert solvent.

EMIL E. NOVOTNY.
GEORGE K. VOGELSANG.

REFERENCES CITED

The following references are of record in the file of this patent:

UNITED STATES PATENTS

| Number | Name | Date |
|---|---|---|
| 2,306,077 | Novotny et al. | Dec. 22, 1942 |